United States Patent [19]

Komai et al.

[11] Patent Number: 5,081,579
[45] Date of Patent: Jan. 14, 1992

[54] SYSTEM FOR CHANGING PRINT FORMAT

[75] Inventors: Kensaku Komai, Yamatokoriyama; Kazuyuki Goto, Osaka, both of Japan

[73] Assignee: Sharp Kabushiki Kaisha, Osaka, Japan

[21] Appl. No.: 436,104

[22] Filed: Nov. 13, 1989

Related U.S. Application Data

[63] Continuation of Ser. No. 104,967, Oct. 6, 1987, abandoned.

[30] Foreign Application Priority Data

Oct. 6, 1986 [JP] Japan .................. 61-238640

[51] Int. Cl.⁵ .............................................. G06F 3/12
[52] U.S. Cl. ........................................ 364/405; 395/117
[58] Field of Search ............... 364/519, 405; 400/322

[56] References Cited

U.S. PATENT DOCUMENTS

| | | | |
|---|---|---|---|
| 4,360,892 | 11/1982 | Endfield | 364/900 |
| 4,400,777 | 8/1983 | Mori | 364/200 |
| 4,408,292 | 10/1983 | Nakatani et al. | 364/405 |
| 4,442,506 | 4/1984 | Endfield | 364/900 |
| 4,484,277 | 11/1984 | Uesugi | 364/405 |
| 4,508,962 | 4/1985 | Yamasaki | 364/405 X |
| 4,575,269 | 3/1986 | Gubau | 400/322 |
| 4,737,922 | 4/1988 | Ogasawara et al. | 364/519 |
| 4,811,219 | 3/1989 | Touji et al. | 364/405 |
| 4,847,762 | 7/1989 | Suzuki | 364/405 |

FOREIGN PATENT DOCUMENTS

| | | |
|---|---|---|
| 0117892 | 9/1984 | European Pat. Off. |
| 0126286 | 11/1984 | European Pat. Off. |
| 0189830 | 8/1986 | European Pat. Off. |
| 2945838 | 7/1980 | Fed. Rep. of Germany |
| 2041598B | 9/1980 | United Kingdom |
| 2041598A | 9/1980 | United Kingdom |

*Primary Examiner*—Gary V. Harkcom
*Assistant Examiner*—Mark K. Zimmerman

[57] ABSTRACT

A print format changing system includes a printer, a device for inputting print format-related information, and a memory containing an edit table region for storing the print format-related information input by the input device, thereby rewriting the print format-related information stored in the edit table region of the memory so as to change the format of data printed out by the printer.

3 Claims, 5 Drawing Sheets

FIG. 2

| EDIT TABLE NO. | EDIT TYPE | SYMBOL 1 | SYMBOL 2 | SYMBOL 3 |
|---|---|---|---|---|
| 1 | 01 | $ (24H) | @ (40H) | SP (20H) |

SYSTEM FOR CHANGING PRINT FORMAT

This application is a continuation of application Ser. No. 07/104,967 filed on Oct. 6, 1987, now abandoned.

BACKGROUND OF THE INVENTION

The present invention relates to a system for changing the print format of unit prices, quantities, and the like printed on say a receipt by an electronic cash register (hereinafter abbreviated as ECR).

A department store, for instance, uses a number of ECR's in a corresponding number of department locations for cash registration work. In such registration work, receipts are issued for the payments received from customers. An example of printout on a receipt is shown in FIG. 4. The name of the store, the date, the unit price and quantity of the commodity sold and the total amount of individual items are printed downward on the receipt 1.

Typically, the receipt 1 shown in FIG. 4 includes a unit price print region 2, and a quantity print region 3 where the quantity of each commodity sold is printed. In printing a unit price of, for example "100" in the unit price print region 2, with the leftmost limit for printing on the receipt 1 as a highest digit place point P1, a point away in the leftward direction by a distance of L1 from the point P1 is set as a print reference point P2. Here, the distance of L1 corresponds to the maximum assumable number of digits to be printed out. So, the unit price is printed out in the unit price print region 2 with the unit digit at the print reference point P2.

Conventionally, the print format data such as the print reference point P2 and the maximum number of digits to be printed out L1 are stored in form of a program in a ROM (read-only-memory) in the ECR, and are therefore difficult to be changed on the user side. To change the print format on the user side, it is necessary to replace the ROM storing the print format with a different ROM, which is quite troublesome for the user.

SUMMARY OF THE INVENTION

In view of the above, the object of the present invention is to provide a print format changing system of remarkably improved operability, capable of changing the print format easily to meet various requirements of users.

According to the present invention, a print format changing system includes a printer a keyboard for inputting print format-related information, and a memory containing an edit table region for storing the print format-related information input at the keyboard so that the print format-related information in the edit table region of the memory is rewritten by using the input keyboard to change the format of the printout by the printer.

In the print format changing system of the present invention, the print format-related information is stored in the edit table region allocated in the memory. Therefore, the printer prints out various data according to the print format read from the edit table region of the memory. If the user wants to print out data in a different format, he may rewrite the print format-related information stored in the edit table region. Then, the printer prints out data according to a new print format. Thus, according to the present invention, the print format can be changed very easily.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 is a plan view of a key input section 12 of the ECR 11;

DESCRIPTION OF THE PREFERRED EMBODIMENT

Figure 1:
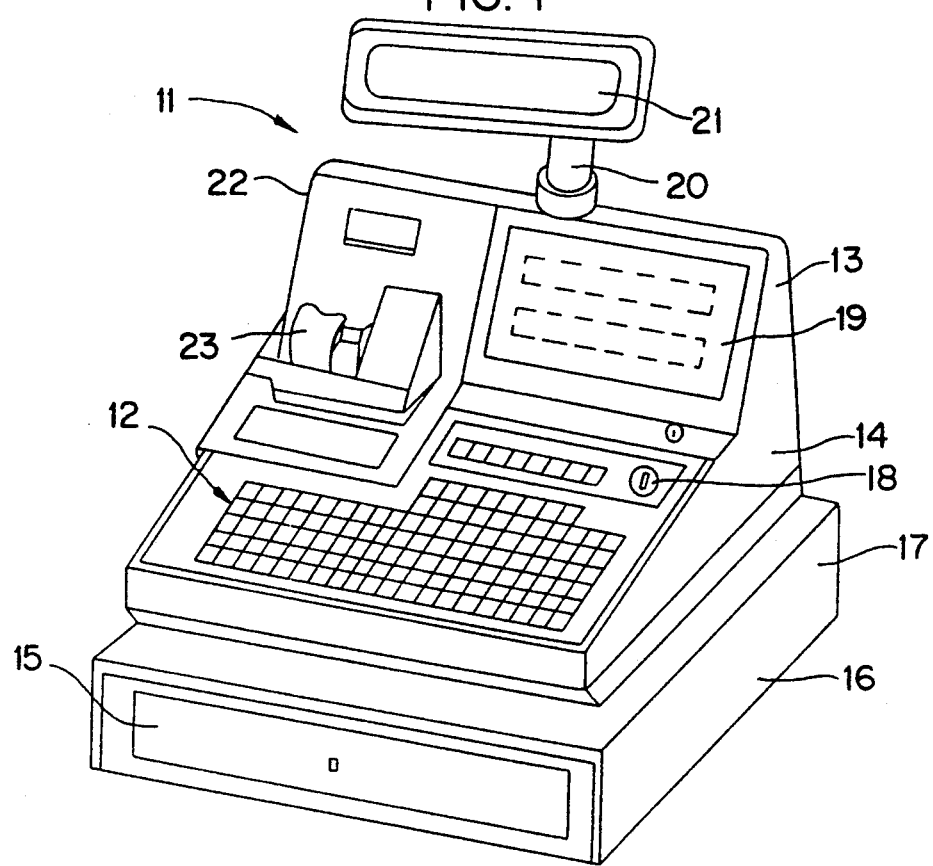
FIG. 1 is a perspective view of an ECR 11 related to an embodiment of the present invention.

FIG. 1 is a perspective view of an ECR (electronic cash register) 11 related to an embodiment of the present invention. Referring to FIG. 1, the ECR 11 includes an ECR main body 14 having a housing 13 with a key input device 12 arranged on the surface of the main body 14 and facing upward, and a cash storage compartment 17 including a housing 16 for accommodating a drawer 15 in which cash is stored. A mode selector switch 18 is provided on the ECR main body 14 in the vicinity of the key input device 12. The mode selector switch 18 is used to select an operation mode of the ECR 11 from among various modes described later.

Information input through the key input device 12 is displayed on a first display panel 19. A second display panel 21 is connected via a mounting leg 20 with the ECR main body 14. Monetary information is displayed on the second display panel 21 for reference by customers. Monetary information input from the key input device 12 is printed on a receipt 23 by a printer 22.

Figure 2:
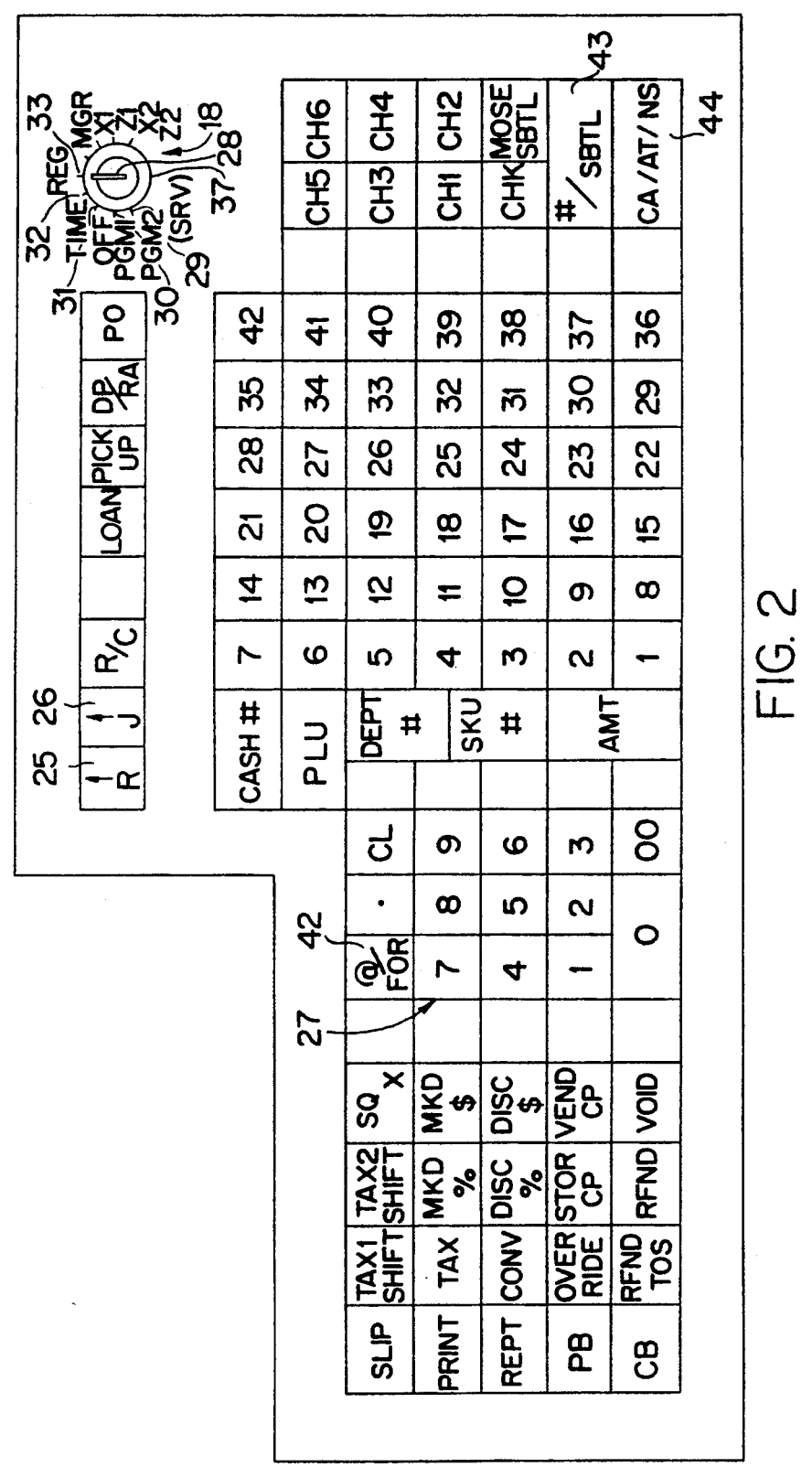

FIG. 2 shows the key arrangement on the key input means 12 set at the cash register mode normally selected for cash registration work in shops and stores. Referring to FIG. 2, the key input device 12 includes a receipt feed key 25 and a journal feed key 26. Here, a journal refers to a printing paper on which the same data as those printed on a receipt 25 (to be handed to a customer) is printed out for storage in the ECR 11. The key input device 12 includes ten keys 27 with which monetary information is input.

The mode selector switch 18 provided adjacent the key input device 12 is used to select the operation mode of the ECR 11 from various modes such as program execution modes (PRG) 29 and 30 in which such data as commodity names stored in the ECR 11 are changed, power off mode (OFF) 31, clock mode (TIME) 23 and cash register mode (REG) 33. To select a desired mode, a key (not shown) is rotated clockwise or counterclockwise in a key hole 28 of the mode selector switch 18.

Figure 3:
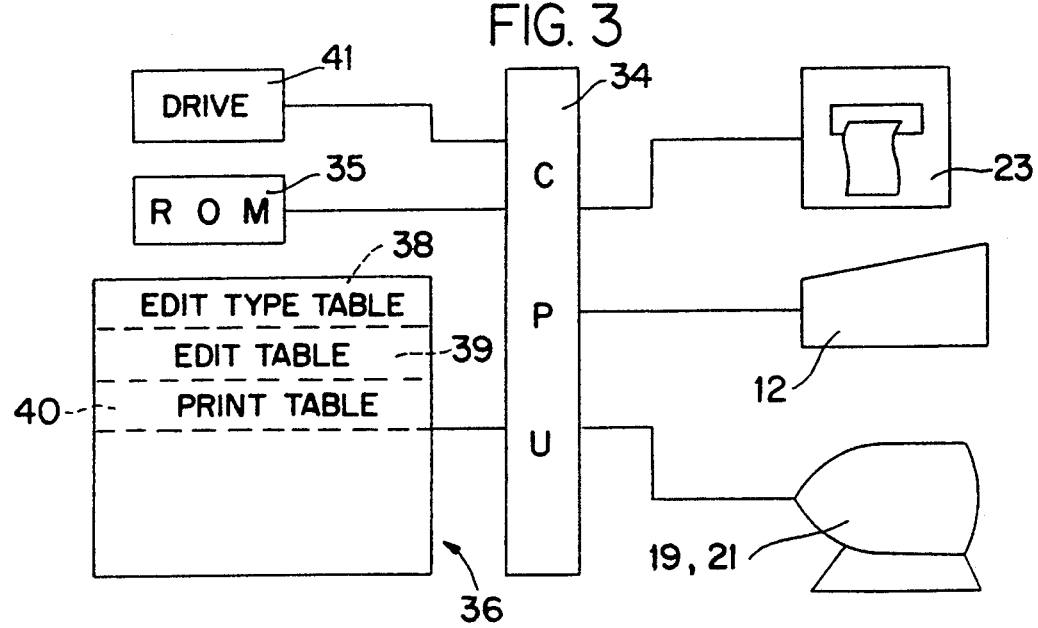
FIG. 3 is a block diagram showing the electrical connection of the ECR 11.

FIG. 3 is a block diagram showing the electrical connection of the ECR 11. Referring to FIG. 3, the ECR 11 contains a central processing unit (hereinafter abbreviated as CPU) 34 realized by a large scale integrated circuit (LSI). The CPU 34 is connected to the key input device 12 and the first and second display panels 19 and 21. It is also connected to a ROM (read-only-memory) 35 and a RAM (random-access-memory) 36. The ROM 35 retains programs for allowing the ECR 11 to execute various operations selected by the mode selector switch 18. The RAM 36 stores print format-related information input with the mode selector switch 18 set at the service mode 37 which will be described later.

The RAM 36 contains an edit type table 38, an edit table 39 and a print table 40 each of which is allocated with a specified memory capacity. A drive mechanism 41 for actuating the cash-storing drawer 15 is also connected to the CPU 34.

Table 1 shows the construction of the edit type table 38 in the RAM 36.

TABLE 1

(Edit Type Table 38)

| Edit Type No. | Edit Type | Description of Point | Memory Type |
|---|---|---|---|
| 0 | No printing | | |
| 1 | ① 9 ② ③ | Tab | Pack sign |
| 2 | ① 9 ② ③ | Registered decimal point | Pack sign |
| 3 | ② ① 9 ③ | Tab | Pack sign |
| 4 | ② ① 9 ③ | Registered decimal point | Pack sign |
| 5 | ① 9 9 9 ... 9 ② ③ | | Pack |
| 6 | ① 9 ② ③ | | " |
| 7 | Character string (No editing) | | |

The ①, ② and ③ in the above Table 1 represents symbols described later. The character "9" represents a numeric data string for a sum of money. The space between ② and ① and in the Edit Type Nos. 3 and 4 and between ① and "9" in the Edit Type No. 6 indicates zero suppression.

The typical construction of the edit table 39 is shown on Table 2 below.

TABLE 2

(Edit Table 39)

| Edit Table | Edit Type | Symbol 1 | Symbol 2 | Symbol 3 |
|---|---|---|---|---|
| No. 1 | 01 | * | SP | SP |
| No. 2 | 07 | SP | SP | SP |
| No. 3 | 02 | SP | x | SP |
| No. 4 | 01 | SP | SP | SP |
| No. 5 | 02 | SP | / | SP |
| No. 6 | 02 | SP | x | SP |

TABLE 2-continued (Edit Table 39)

| Edit Table | Edit Type | Symbol 1 | Symbol 2 | Symbol 3 |
|---|---|---|---|---|
| . | | | | |
| . | | | | |
| No. 16 | 00 | SP | SP | SP |

Here "Sp" indicates a space. The edit table 39 includes an edit type column and symbol 1 through symbol 3 columns, each column having 16 lines. Since one byte memory capacity is allocated for each data, the edit table 39 has a memory capacity of 64 bytes at the maximum.

"No. 1" through "No. 16" indicating edit types on Table 2 above are displayed in terms of 8 bit binary numbers with the following bit construction:

$$C7, C6, C5, C4, C3, C2, C1, C0 \ldots \quad (1)$$

The bits C6 through C0 are used for indicating the numerals 01 to 16 in the edit type column. C7, the most significant bit, is used as a flag for setting the character size of data printed according to the selected edit type. Specifically, data is printed with normal size characters when C7 is set at 0, and with double size characters when C7 is set at 1.

The construction of the print table 40 is shown in Tables 3 through 6. The edit table numbers in the print table 40 correspond to the edit table Nos. "1" through "16" on Table 2.

TABLE 3

(Print Table 40)

| Table No. | Items | | Edit Table | Print Position | Number of Digits (Characters) |
|---|---|---|---|---|---|
| 1 | DPT/ PLU/ SKU/ UPC | Multiplication Quantity | 06 | 08 | 06 |
| 2 | | Unit price | 04 | 20 | 08 |
| 3 | | Continued Quantity 1 | 06 | 08 | 06 |
| 4 | | multiplication Quantity 2 | 06 | 08 | 06 |
| 5 | | Unit price | 04 | 20 | 08 |
| 6 | | Split pricing Quantity | 06 | 08 | 06 |
| 7 | | Base quantity | 05 | 08 | 02 |
| 8 | | Unit price | 04 | 20 | 08 |
| 9 | | Scale Quantity | 12 | 00 | 00 |
| 10 | | Unit price | 12 | 00 | 00 |
| 11 | | Scale split Quantity | 12 | 00 | 00 |
| 12 | | pricing Base quantity | 12 | 00 | 00 |
| 13 | | Unit price | 12 | 00 | 00 |
| 14 | | Single Text | 02 | 01 | 10 |
| 15 | | commodity Amount | 01 | 22 | 08 |
| 16 | | Modify | 00 | 12 | 00 |

TABLE 3-continued (Print Table 40)

| Table No. | Items | | Edit Table | Print Position | Number of Digits (Characters) |
|---|---|---|---|---|---|
| 17 | Add up | Text | 02 | 01 | 10 |

TABLE 4

(Print Table 40)

| Table No. | Items | | Edit Table | Print Position | Number of Digits (Characters) |
|---|---|---|---|---|---|
| 18 | Add up | Amount | 01 | 22 | 08 |
| 19 | Received | Text | 02 | 01 | 10 |
| 20 |  | Amount | 01 | 22 | 08 |
| 21 | Change | Text | 02 | 01 | 10 |
| 22 |  | Amount | 01 | 22 | 08 |
| 23 | MKD % | Text | 02 | 01 | 10 |
| 24 |  | Rate | 08 | 19 | 05 |
| 25 |  | Text (Item) | 12 | 00 | 00 |
| 26 |  | Amount | 01 | 22 | 10 |
| 27 |  | Modify | 00 | 12 | 00 |
| 28 | Discount % | Text | 02 | 01 | 10 |
| 29 |  | Rate | 08 | 19 | 05 |
| 30 |  | Amount | 01 | 22 | 10 |
| 31 |  | Modify | 00 | 12 | 00 |
| 32 |  | Text | 02 | 01 | 10 |
| 33 | MKD $ | Text (Item) | 02 | 01 | 08 |
| 34 | Store coupon | Amount | 01 | 22 | 08 |

TABLE 5

(Print Table 40)

| Table No. | Items | | Edit Table | Print Position | Number of Digits (Characters) |
|---|---|---|---|---|---|
| 35 |  | Modify | 00 | 12 | 00 |
| 36 | Discount $ | Text | 02 | 01 | 10 |
| 37 | Fee vendor | Amount | 01 | 22 | 08 |
| 38 | Coupon | Modify | 00 | 12 | 00 |
| 39 | MOSST, SBTL, Tray | Text | 02 | 01 | 10 |
| 40 | total, TAXABUEST | Amount | 01 | 22 | 08 |
| 41 | Total, FSSBTL | Text | 02 | 01 | 10 |
| 42 |  | Amount | 01 | 22 | 08 |
| 43 | Tex (Manual auto) | Text | 02 | 01 | 08 |
| 44 |  | Amount | 01 | 22 | 08 |
| 45 |  | Modify | 00 | 12 | 00 |
| 46 | Non add code | Code | 07 | 17 | 16 |
| 47 | No sale | Text | 02 | 01 | 10 |
| 48 | PA/PO/CA - CHK/ | Text | 02 | 01 | 10 |
| 49 | Loan/Pick up | Amount | 01 | 22 | 08 |
| 50 |  | Modify | 00 | 12 | 00 |
| 51 | Sale's q'ty | Text | 02 | 03 | 10 |

TABLE 6

(Print Table 40)

| Table No. | Items | | Edit Table | Print Position | Number of Digits (Characters) |
|---|---|---|---|---|---|
| 52 |  | Quantity | 10 | 19 | 04 |
| 53 | PBAL | Text | 02 | 01 | 08 |
| 54 |  | Amount | 01 | 22 | 08 |
| 55 | Balance | Text | 02 | 01 | 08 |
| 56 |  | C/D | 09 | 10 | 01 |
| 57 |  | Amount | 01 | 22 | 08 |
| 58 | Conversion | Text | 02 | 01 | 08 |
| 59 |  | Rate | 11 | 18 | 06 |
| 60 |  | Amount | 01 | 22 | 08 |

Numbers of two digits shown in the print position column on Tables 3 through 6 represent the maximum number of digits to be printed out L1 which determines the print reference point P2 in the unit price printing region 2 at which the unit digit of a price is printed. The figures in the number of digits (characters) column in Tables 3 through 6 represent the number of digits for unit prices printed in the unit price printing region 2.

The printing operation by the ECR 11 is described with reference to FIGS. 1 through 7. In the description, it is assumed that two commodities whose unit price is $100 have been purchased. First, the user inputs "2" for the quantity by using the ten keys 27 and depresses the "@" key 42. Then the CPU 34 of the ECR 11 operates, referring to the print table 40 in the order of the table No. Namely, operation starts from the multiplication in the table No. 1 at which quantity is printed out.

In accordance with "06" for the edit table No., the CPU 34 reads the data in the edit table No. 6 of the edit table 39 shown on Table 2. Since the edit type of the edit table No. 6 is "02", reference is made to edit type No. 2 of the edit type table 38 shown on Table 1.

The edit type No. 2 represents the print format in which the symbol ①, a numeric data, the symbol ② and the symbol ③ are printed out successively in this order, with the print reference point set at the unit digit of the numeric data to be printed out. "Pack sign" indicates that the data contains the sign "±". Reference is then made to the data in the symbol 1 to symbol 3 columns for edit table No. 6 in the edit table 39 on Table 2. The symbols ①, ② and ③ in the edit type table 39 represent data in the columns of symbol 1, symbol 2 and symbol 3, respectively, of the edit table 39. Since these data for edit table No. 6 are:

$$SP \times SP \ldots \qquad (2)$$

a space is put in place of the symbols ① and ③ and an "X" in place of the symbol ② in the print format of the edit type No. 2.

Figure 4:
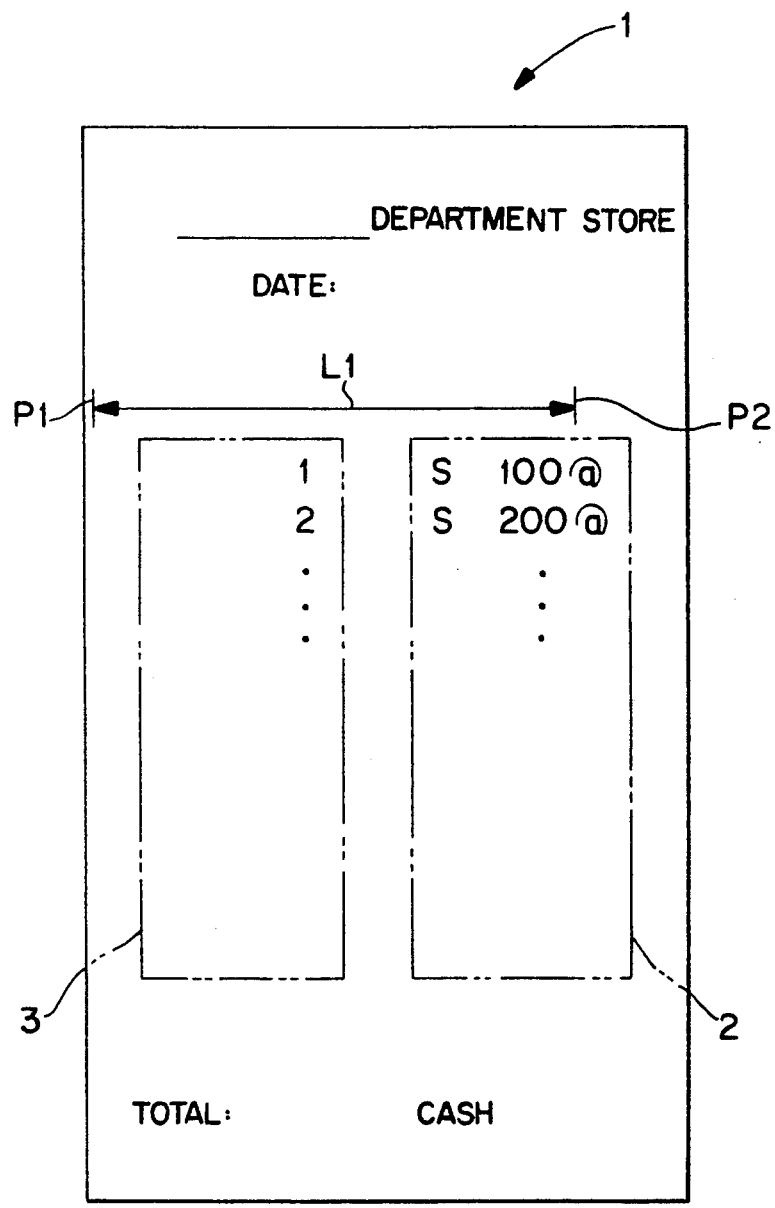
FIG. 4 is a plan view of a receipt 1 on which data is printed by the ECR 11.

Then, in accordance with "08" for the print position shown on Tables 3 through 6, the distance L1 from the point P1, or the maximum number of digits to be printed out on the receipt 1 of FIG. 4 is set at 08, which determines the print reference point P2. From "06" for the number of digits shown on Tables 3 through 6, it is understood that the number of digits or characters of data to be printed out is six. Using this format, the printer 22 prints out:

$$2X \ldots \qquad (3)$$

Thus, the numerals for quantities and unit prices and various other characters are printed out following the above process.

It is intended that the present invention provides a system for changing data in the edit table 39 on Table 2 and in the print table 40 on Tables 3 through 6 by using the key input means 12 to modify the format of the data printed out on the receipt 1.

Figure 5:
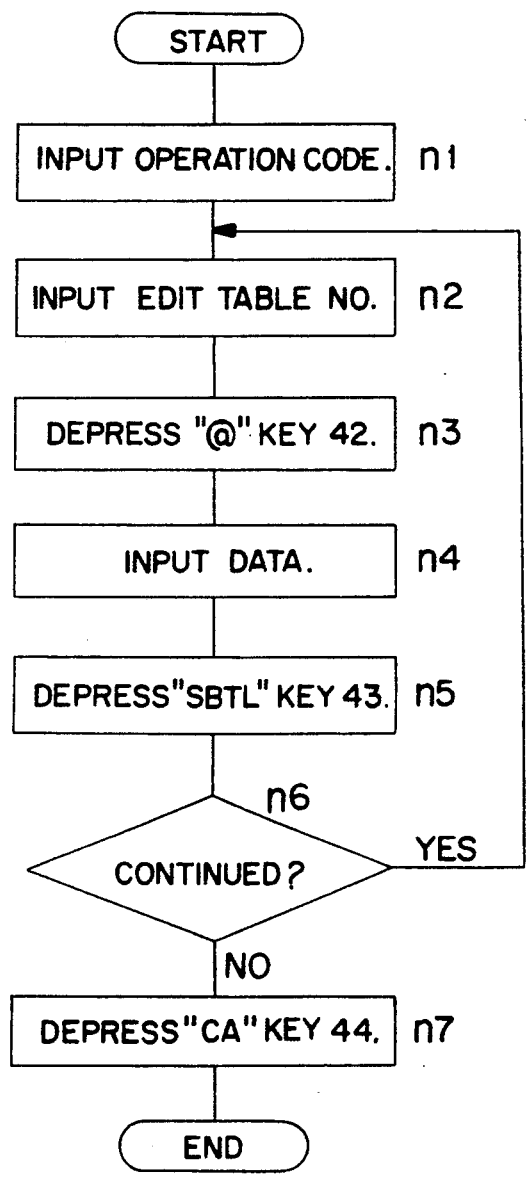
FIG. 5 is a flow chart of the operation procedure of the present invention.

FIG. 5 is a flow chart showing the operation procedure for changing data in the edit table 39 on Table 2. The procedure is described with reference to FIGS. 1 through 5. In step n1 of FIG. 5, the operator rotates the specified key in the mode selector switch 18 of the ECR 11 to change the operation mode from, say for example the normal register mode to the service mode (SVR) 37, and operates ten keys 27 to call the program for changing data in the edit table 39.

In step n2, referring to the edit table 39, the operator inputs, by using ten keys 27, the edit table No. (1 to 16) containing data to be corrected, and operates the "@" key 42 in the step n3 to make the ECR 11 ready to accept data input in the edit table 39.

In step n4, the operator inputs data for the edit type and for the symbols 1 through 3 of the edit table 39 shown on Table 2. These data are displayed in terms of 11-digit numerical data strings shown below:

$$D10, D9, D8, D7, D6, D5, D4, D3, D2, D1, D0 \ldots \qquad (4)$$

Figures 6, 7:
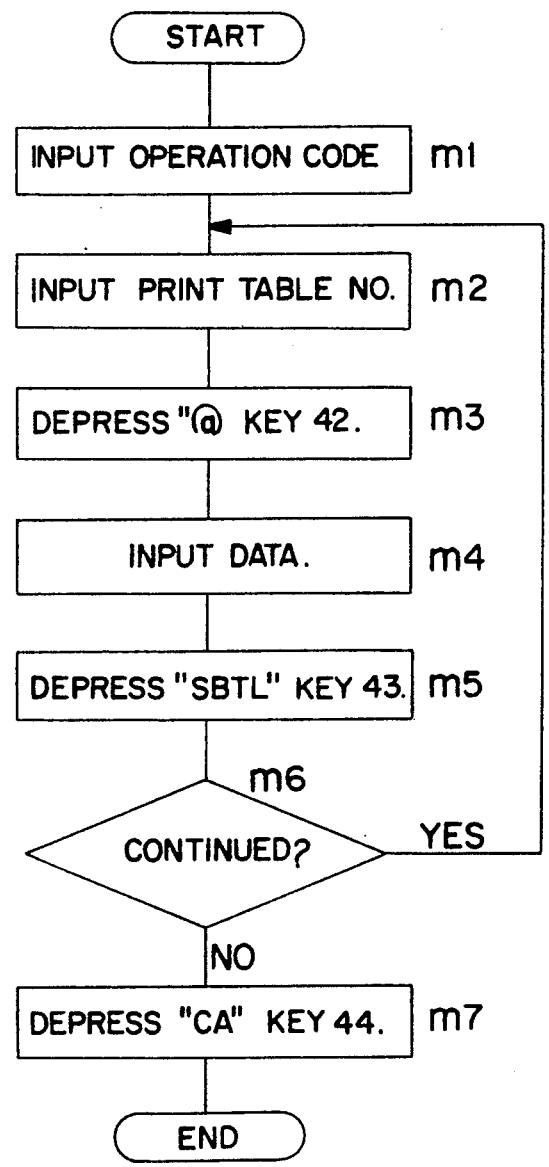
FIG. 6 shows an example of data set in the edit table 39.
FIG. 7 is a flow chart of the operation procedure for changing data in the print table 40.

FIG. 6 shows an example of data setting in which a data string "$@SP" is set at the edit table No. 1 in the edit table 39. The numerical value shown in parentheses under each character setting in FIG. 6 is the ASCII code in hexadecimal notation corresponding to the character. In a actual input operation, the hexadecimal data code is converted to a decimal number and the decimal number is input. The data string of D0, D1, D2 in the above expression (4) corresponds to the data for the symbol 3, the data string of D3, D4, D5 to the data for the symbol 2, and the data string of D6, D7, D8 to the data for the symbol 1. The data D9 and D10 corresponds to the data for the edit type on Table 2. In other words, the data of D9 and D10 is equivalent to the data string C0 to C7 in the expression (1): the data D9 corresponds to the data string C0 to C6, and the data D10 to the data C7.

After the above data is input, the operator depresses the sub total (SBTL) key 43 in step n5. With this key operation, new data input in step n4 replaces the old data in the edit table 39 on Table 2 as exemplified in FIG. 6.

In step n6, the operator decides whether or not the correcting operation is continued. If yes, the operator returns to step n2 to designate a new edit table No. for data correction. If no, the operator proceeds to step n7 and depresses CA key 44 to end the procedure.

FIG. 7 is a flow chart showing the operation procedure for changing data in the print table 40 shown on Tables 3 through 6. The procedure is described with reference to FIGS. 1 through 7. In step m1 of FIG. 7, the operator inputs a code forking the program for this procedure as in step n1 of FIG. 5. In step m2, referring to the print table 40 shown in Tables 3 through 6, the operator inputs the table No. (1 to 62) containing data to be corrected, and depresses the @ key 42 in step m3. Then in step m4, the operator inputs data for the edit table No., data for the print position, and data for the number of digits in the print table 40. These data are input in form of a seven-digit data string shown below:

$$E6, E5, E4, E3, E2, E1, E0 \ldots \qquad (5)$$

The data string of E0, E1 represents the number of digits of the data printed in, for example, the unit price print region 2 of the receipt 1 of FIG. 4. The data string E2, E3 corresponds to the maximum number of digits to be printed out L1 which determines the print reference point P2 in the unit price print region 2 of FIG. 4. The numeric value for this data string is 1 to 22 for a receipt and 1 to 48 for a slip.

The data string E4, E5, E6 corresponds to the edit table No. in the edit table 39 on Table 2: the data string E4, E5 represents the edit table No. (1 to 16) and the data E6, the most significant bit, is a flag determining whether the data in the format designated by the input edit table No. is printed or not. The data is printed when E6=1, and not when E6=0.

Following the above data input, the operator depresses SBTL key 43 in step m5 to replace the old data with new data in the print table 40. Then in step m6, the operator decides whether or not the correction operation is continued. If yes, the operator returns to step m2 to designate a new print table No. for data correction.

If no in step m6, the operator proceeds to the step m7 and depresses CA key 44 to end the procedure.

According to the present invention, as understood from the above, the print format of various data printed out by the ECR 11 can be changed easily by using the key input device 12, so that it is easy to adapt the ECR's 11 installed in a store to a new line of commodities added to the existing ones in the store as well as to possible future changes in the print format demanded by law. According to the present invention, print format can be changed without putting users to the trouble of replacing the ROM as required in the prior art. Consequently, the operability of the ECR 11 is improved remarkably.

Although the print format changing system of the present invention has been described above as related to an ECR, it may be applied widely to any apparatus having a printing function.

While only certain embodiments of the present invention have been described, it will be apparent to those skilled in the art that various changes and modifications may be made therein without departing from the spirit and scope of the present invention as claimed.

What is claimed is:

1. A system in an electronic cash register for changing print format, comprising:
   input means for inputting transaction and print format information into said cash register, said transaction information including price and quantity of goods and said print format information including instructions for horizontally positioning said transaction information in a single print line;
   memory means for storing said print format information, said memory means including an edit type table region, an edit table region, and a print table region, each of said table regions being operatively interconnected and allocated with specified memory capacities, wherein said edit type table region includes information related to positioning of symbols and numeric data strings, said edit table region includes information related to character size and font type, and said print table region includes information for determining a print reference point from which horizontal printing is started and a maximum number of digits printable in a unit price region according to said print reference point;

means for accessing said memory means in an edit mode whereby said print format information is edited to reformat the horizontal positioning of said transaction information, wherein said format information relating to character size and font type in said edit table region is automatically correlated to said format information relating to character strings and symbols in said edit type table region and thereby outputting said transaction information at a predetermined print reference point associated with said print format information; and means for printing said transaction information in the reformatted horizontal positioning.

2. The system according to claim 1, wherein said print reference point is the position of a unit digit for a single unit price input as transaction information.

3. The system according to claim 1, wherein said means for printing prints said transaction information on a paper receipt in at least two print areas including a quantity area and a unit price area whereby a single input transaction is horizontally spaced on a single print line according to said format information.

* * * * *